Patented Apr. 4, 1950

2,502,569

UNITED STATES PATENT OFFICE 2,502,569

MANUFACTURE OF ALKYLCYCLOPENTANE HYDROCARBONS

Vladimir N. Ipatieff and Herman Pines, Chicago, Ill., assignors to Universal Oil Products Company, Chicago, Ill., a corporation of Delaware No Drawing. Application December 30, 1947, Serial No. 794,773

4 Claims. (Cl. 260—666)

This invention relates to a process for manufacturing alkylcyclopentane hydrocarbons.

An object of this invention is to produce an alkylcyclopentane hydrocarbon by the conversion of a bicycloalkane hydrocarbon containing a ring of 5-carbon atoms and a second ring of 6-carbon atoms.

One specific embodiment of this invention relates to a process for manufacturing alkylcyclopentane hydrocarbons which comprises destructively dehydrogenating a bicycloalkane hydrocarbon containing a ring of 5-carbon atoms and a second ring of 6-carbon atoms.

Another embodiment of this invention relates to a process for manufacturing alkylcyclopentane hydrocarbons which comprises dehydrogenating a bicycloalkane hydrocarbon containing a ring of 5-carbon atoms and a second ring of 6-carbon atoms in the presence of a dehydrogenating catalyst.

We have found that a bicycloalkane hydrocarbon having a ring of 5-carbon atoms and a second ring of 6-carbon atoms can be hydrogenated destructively to form substantial yields of alkylcyclopentane hydrocarbons. This process is new and unexpected since other bicycloalkane hydrocarbons having one ring of 3 or 4 carbon atoms and a second ring of 6-carbon atoms yield only alkylcyclohexane hydrocarbons when hydrogenated destructively.

Camphane, isocamphane, isobornylane, and fenchane are examples of bicycloalkane charging stocks suitable for our process as each of these hydrocarbons contain one ring of 5-carbon atoms and a second ring of 6-carbon atoms.

The process is carried out in the presence of dehydrogenation catalyst either in the form of one or more fixed beds or layers of solid catalysts in a suitable reactor or as powdered catalyst utilizable in so-called fluidized operation in which the vapors of the reacting hydrocarbons are mixed with finely divided catalyst and contacted in a suitable reactor after which the hydrocarbons and catalysts are separated and the used catalyst is returned to further use in the process. Such dehydrogenation catalysts comprise metals selected from the members of group VI and group VIII of the periodic table and include particularly chromium, cobalt, nickel, palladium and platinum. It is generally preferred to employ dehydrogenation catalyst in which the metal or its oxide is supported by or composited with a suitable carrier such as alumina, silica, and the like. Platinum-alumina, chromium sesquioxide-alumina and nickel-silica are highly effective catalysts for this process.

This process is carried out by contacting the bicycloalkane hydrocarbon or a mixture of bicycloalkane hydrocarbons with hydrogen at destructive dehydrogenation conditions in the presence of one or more of the aforementioned catalysts, either in a batch or continuous type of operation.

In batch type operation, the hydrocarbon charging stock and catalyst are placed in a suitable autoclave and heated at a temperature of from about 150° to about 400° C. for a time sufficient to cause destructive hydrogenation and the production of a substantial yield of alkylcycloalkane hydrocarbons.

The process may be carried out continuously by passing the hydrocarbon reactants and hydrogen through a heated tubular reactor containing one or more layers or sections of granular dehydrogenation catalysts, the operating temperature being generally from about 150° to about 400° C. and the operating pressure being from about 50 to about 150 atmospheres. It is generally preferred to carry out the process at a pressure of about 100 atmospheres. The operating temperature to be used in either batch or continuous operation is also dependent upon the activity of the catalyst. With the more active catalysts, such as various composites of platinum and alumina, nickel and silica, a temperature of from about 150° to about 300° C. is preferred for producing alkylcyclopentane hydrocarbons in high yields as some decomposition of these desired hydrocarbons occurs in the presence of these catalysts at temperatures of from about 300° to about 400° C. In the presence of a less active dehydrogenation catalyst such as copper-alumina, this process is effected preferably at a temperature of from about 300° to about 400° C. as the process proceeds at a rather slow rate at temperatures of between 150° and 300° C.

This process for producing alkylcyclopentane hydrocarbons is illustrated by the following examples:

Example I 120 grams of isobornylane and 12 grams of a nickel-diatomaceous earth catalyst were placed in a steel autoclave of 450 cc. capacity, hydrogen was introduced thereto at a pressure of 100 atmospheres and the charged autoclave was rotated and heated for 6 hours at a temperature of from about 210° to about 220° C. The autoclave was then cooled, excess hydrogen was released and the mixture of liquid hydrocarbons and catalyst was taken from the autoclave. After separation of the catalyst therefrom, the resultant hydrocarbon material was subjected to fractional distillation. The main portion of the hydrocarbon product distilled from 140° to 165° C. and was shown to be a mixture of alkylcyclopentane hydrocarbons since this hydrocarbon material did not undergo dehydrogenation to form aromatic hydrocarbons when passed over a platinum-alumina catalyst at a temperature of 300° C.

*Example II*

In a run similar to that described in Example I, 195 grams of isocamphane was destructively hydrogenated in the presence of 10% by weight of the nickel-diatomaceous earth catalyst at a temperature of 210°–220° C. The resultant hydrocarbon product distilled between 140° and 165° C. and consisted essentially of alkylcyclopentane hydrocarbons as attempts to dehydrogenate this hydrocarbon material over platinized alumina at 300° C. failed to yield detectable amounts of aromatic hydrocarbons.

We claim as our invention:

1. A process for manufacturing alkylcyclopentane hydrocarbons which comprises destructive hydrogenating a bicycloalkane hydrocarbon having only two rings including a ring of 5-carbon atoms and a second ring of 6-carbon atoms with four carbon atoms common to the two rings at a pressure of from about 50 to about 150 atmospheres.

2. A process for manufacturing alkylcyclopentane hydrocarbons which comprises destructive hydrogenating a bicycloalkane hydrocarbon having only two rings including a ring of 5-carbon atoms and a second ring of 6-carbon atoms with four carbon atoms common to the two rings at a pressure of from about 50 to about 150 atmospheres in the presence of a dehydrogenation catalyst.

3. A process for manufacturing alkylcyclopentane hydrocarbons which comprises destructive hydrogenating a bicycloalkane hydrocarbon having only two rings including a ring of 5-carbon atoms and a second ring of 6-carbon atoms with four carbon atoms common to the two rings in the presence of a dehydrogenation catalyst at a temperature of from about 150° to about 400° C. and at a pressure of from about 50 to about 150 atmospheres.

4. A process for manufacturing alkylcyclopentane hydrocarbons which comprises destructive hydrogenating a bicycloalkane hydrocarbon having only two rings including a ring of 5-carbon atoms and a second ring of 6-carbon atoms with four carbon atoms common to the two rings in the presence of a nickel catalyst at a temperature of from about 150° to about 300° C. and at a pressure of from about 50 to about 150 atmospheres.

VLADIMIR N. IPATIEFF.
HERMAN PINES.

REFERENCES CITED

The following references are of record in the file of this patent:

Ipatieff et al.: Jour. Organic Chem., vol. 12, 34–42 (1947).

Ipatieff et al.: Jour. Am. Chem. Soc., vol. 69, 1948–52 (1947).

Zelinsky et al.: Berichte, vol. 60, 1098–1100 (1927).

Zelinsky et al.: Annalen, vol. 476, 63 (1929).

Lipp: Berichte, vol. 56, 2103 (1923).